(12) United States Patent  (10) Patent No.: US 9,043,128 B2
Hollis  (45) Date of Patent: May 26, 2015

(54) DIVE COMPUTER INCORPORATING STORED DIVE SITE INFORMATION

(75) Inventor: Robert R. Hollis, San Leandro, CA (US)

(73) Assignee: PELAGIC PRESSURE SYSTEMS, San Leandro, CA (US)

( * ) Notice: Subject to any disclaimer, the term of this patent is extended or adjusted under 35 U.S.C. 154(b) by 1044 days.

(21) Appl. No.: 12/108,294

(22) Filed: Apr. 23, 2008

(65) Prior Publication Data

US 2009/0018771 A1  Jan. 15, 2009

Related U.S. Application Data

(60) Provisional application No. 60/913,503, filed on Apr. 23, 2007.

(51) Int. Cl.
*G01C 13/00* (2006.01)
*G01C 21/20* (2006.01)
*B63C 11/32* (2006.01)
*B63C 11/02* (2006.01)

(52) U.S. Cl.
CPC .............. *G01C 13/008* (2013.01); *B63C 11/32* (2013.01); *B63C 2011/021* (2013.01); *G01C 21/20* (2013.01)

(58) Field of Classification Search
CPC .. B63C 11/32; B63C 2011/021; B63C 11/26; G01C 13/008; G01C 21/20; G01C 21/203; G01C 5/00; G01C 21/22; G01C 21/34; B63B 43/18; B63B 2201/26; B63G 8/38; B63J 2099/008; G01S 19/14; G01S 19/36; G01S 19/42; G01S 19/19; G01S 19/41; G01S 19/51; G01S 19/35; G01S 19/45; Y10S 367/909; Y10S 367/907; H04B 11/00; G08G 1/096844; G08G 1/096894; G08G 1/096872; G08G 1/096883; G08G 1/096861

See application file for complete search history.

(56) References Cited

U.S. PATENT DOCUMENTS

| | | |
|---|---|---|
| 3,469,231 A | 9/1969 | Geiling et al. |
| 3,813,687 A | 5/1974 | Geil |
| 4,107,995 A | 8/1978 | Ligman et al. |

(Continued)

FOREIGN PATENT DOCUMENTS

| | | |
|---|---|---|
| GB | 1421928 | 1/1976 |
| WO | 98/17526 | 4/1998 |

(Continued)

OTHER PUBLICATIONS

Author Unknown, "DiveBuddy Basic 2.1.3", http://palmsource.palmgear.com/index.cfm?fuseaction=software.showsoftware$prodid=41824.

(Continued)

*Primary Examiner* — Bao Long T Nguyen
(74) *Attorney, Agent, or Firm* — KPPB LLP

(57) ABSTRACT

Dive computers in accordance with embodiments of the invention are disclosed that store information concerning a dive site. The stored information can be accessed during the dive to provide information concerning such things as points of interest and/or hazards. One embodiment of the invention includes a processor, memory connected to the processor, a pressure transducer connected to the processor and configured to measure depth, and a display connected to the processor. In addition, the memory contains factual information concerning a dive site, and the processor is configured to display at least a portion of the stored factual information concerning the dive site via the display.

10 Claims, 14 Drawing Sheets

(56) References Cited

U.S. PATENT DOCUMENTS

| | | |
|---|---|---|
| 4,563,758 A | 1/1986 | Paternostro |
| 4,586,136 A | 4/1986 | Lewis |
| 4,635,242 A | 1/1987 | Hart |
| 4,682,363 A | 7/1987 | Goldfarb et al. |
| 4,683,587 A | 7/1987 | Silverman |
| 4,999,606 A | 3/1991 | Comerford et al. |
| 5,010,529 A | 4/1991 | Maynus |
| 5,033,818 A | 7/1991 | Barr |
| 5,148,412 A | 9/1992 | Suggs |
| 5,156,055 A | 10/1992 | Hollis et al. |
| 5,161,828 A | 11/1992 | Hynes et al. |
| 5,191,317 A | 3/1993 | Toth et al. |
| 5,301,668 A | 4/1994 | Hales |
| 5,331,602 A | 7/1994 | McLaren |
| 5,500,806 A | 3/1996 | Bellin et al. |
| 5,512,941 A | 4/1996 | Takahashi et al. |
| 5,523,982 A | 6/1996 | Dale |
| 5,570,323 A | 10/1996 | Prichard et al. |
| 5,685,722 A | 11/1997 | Taba |
| 5,798,733 A | 8/1998 | Ethridge |
| 5,850,626 A | 12/1998 | Kallio |
| 5,899,204 A | 5/1999 | Cochran |
| 5,956,291 A * | 9/1999 | Nehemiah et al. ............ 367/131 |
| 5,995,882 A | 11/1999 | Patterson et al. |
| 6,054,929 A | 4/2000 | Garofalo et al. |
| 6,125,080 A | 9/2000 | Sonnenschein et al. |
| 6,272,073 B1 | 8/2001 | Doucette et al. |
| 6,319,079 B1 * | 11/2001 | Cooper ........................ 440/12.5 |
| 6,360,182 B1 | 3/2002 | Hales |
| 6,390,640 B1 | 5/2002 | Wong et al. |
| 6,396,769 B1 | 5/2002 | Polany |
| 6,525,762 B1 | 2/2003 | Mileski et al. |
| 6,543,444 B1 | 4/2003 | Lewis |
| 6,549,850 B2 | 4/2003 | Punkka et al. |
| 6,701,252 B2 | 3/2004 | Brown |
| 6,712,017 B2 | 3/2004 | Harrie et al. |
| 6,734,808 B1 * | 5/2004 | Michaelson et al. .......... 340/984 |
| 6,769,508 B1 | 8/2004 | O'Connor |
| 6,791,490 B2 | 9/2004 | King |
| 6,807,127 B2 | 10/2004 | McGeever, Jr. |
| 6,941,226 B2 | 9/2005 | Estep |
| 6,972,715 B2 | 12/2005 | Hollis et al. |
| 6,977,671 B1 | 12/2005 | Kitson et al. |
| 7,047,114 B1 * | 5/2006 | Rogers ............................ 701/21 |
| 7,139,647 B2 * | 11/2006 | Larsen ............................ 701/21 |
| 7,268,703 B1 * | 9/2007 | Kabel et al. ................... 340/984 |
| 8,009,516 B2 * | 8/2011 | Crowell ........................ 367/128 |
| 8,174,436 B2 | 5/2012 | Hollis et al. |
| 8,847,818 B2 | 9/2014 | Hollis et al. |
| 2002/0140599 A1 | 10/2002 | King |
| 2003/0115010 A1 | 6/2003 | Estep |
| 2003/0135326 A1 | 7/2003 | Brown |
| 2004/0022129 A1 * | 2/2004 | McGeever, Jr. ............... 367/128 |
| 2004/0068371 A1 * | 4/2004 | Estep ............................ 701/213 |
| 2004/0196180 A1 * | 10/2004 | Hollis et al. ............. 342/357.06 |
| 2005/0033509 A1 * | 2/2005 | Clapper ........................ 701/201 |
| 2005/0248444 A1 | 11/2005 | Joao |
| 2006/0064242 A1 * | 3/2006 | Litvack et al. ................ 701/202 |
| 2006/0066477 A1 * | 3/2006 | Hollis et al. ............. 342/357.07 |
| 2012/0220317 A1 | 8/2012 | Hollis et al. |
| 2013/0027541 A1 | 1/2013 | Hollis et al. |

FOREIGN PATENT DOCUMENTS

| | | |
|---|---|---|
| WO | 98/45969 | 10/1998 |
| WO | 00/55676 | 9/2000 |

OTHER PUBLICATIONS

Author Unknown, "DiveComputer for the Palm Pilot", published Mar. 15, 2001, http://members.aol.com/GLorensen/divecomp.html.

Loyst et al., "Dive Computers: A Consumer's Guide to History, Theory and Performance", Watersport Publishing, Inc., 1991, pp. 1-146.

Alameda, Jr., William, "SEADeViL a Totally Integrated Inertial Navigation System (INS) Solution", Underwater Intervention Symposium, 2002, New Orleans, Feb. 27-Mar. 2, 2002. pp. 1-6., 2002, 1-6.

* cited by examiner

DIVE COMPUTER INCORPORATING STORED DIVE SITE INFORMATION

CROSS-REFERENCE TO RELATED APPLICATIONS

The current invention claims priority to U.S. Provisional Application No. 60/913,503, filed Apr. 23, 2007, the disclosure of which is incorporated herein by reference.

BACKGROUND

The present invention relates generally to information systems and more specifically to creating an underwater information system that can be utilized in conjunction with a dive computer.

The development of self-contained breathing systems has enabled humans to explore the underwater environment with much greater freedom. Many sources of information are relied upon by divers in preparing for dives. Once a dive is commenced the main source of information available to a diver is the diver's dive computer. Dive computers are typically capable of providing a diver with information concerning the time, depth and the amount of air available to the diver.

SUMMARY OF THE INVENTION

Devices in accordance with the present invention provide information concerning location underwater and provide information about the underwater environment that is location dependent.

One embodiment of the invention includes a processor, memory connected to the processor, a pressure transducer connected to the processor and configured to measure depth, and a display connected to the processor. In addition, the memory contains factual information concerning a dive site, and the processor is configured to display at least a portion of the stored factual information concerning the dive site via the display.

In a further embodiment, the memory is a removable non-volatile memory.

In another embodiment, the processor is configured to obtain location information, and the processor is configured to retrieve factual information from the memory based upon the location information obtained by the processor.

A still further embodiment also includes a GPS receiver connected to the processor. In addition, the processor obtains location information from the GPS receiver.

Still another embodiment also includes a plurality of sensors configured to provide outputs to the processor. In addition, the memory contains a stored location, and the processor obtains location information by estimating movement from the stored location using the output provided by one or more of the sensors.

In a yet further embodiment, the plurality of sensors includes a compass and an impeller.

In yet another embodiment, the plurality of sensors includes an inertial measurement unit.

A further embodiment again also includes a display connected to the processor. In addition, the processor is configured to generate a display using retrieved information.

In another embodiment again, the information concerning a dive site includes at least one way point, the retrieved information includes information concerning the location of the way point, and the display includes directions from the obtained location to the way point.

A further additional embodiment also includes a communication port connected to the processor. In addition, the communication port is configured to receive signals from external devices.

In another additional embodiment, the communication port is configured to receive signals from an external device that are indicative of information concerning a dive site.

In a still yet further embodiment, the communication port is configured to generate signals that are indicative of information recorded during a dive.

Still yet another embodiment includes an output device connected to the processor. In addition, the information concerning a dive site includes information concerning potential hazards, the processor is configured to search for hazards proximate the obtained location, and the processor is configured to provide an alert using the output device in response to the detection of a hazard proximate the obtained location.

In a still further embodiment again, an input device connected to the processor. In addition, the processor is configured to store information indicative of information provided to the processor by the input device, and the processor is configured to store the obtained location information in association with the stored information indicative of information provided to the processor by the input device.

In still another embodiment again, the input device is a camera, and the information indicative of information provided to the processor by the input device is a digital image.

In a yet further embodiment again, the input device is a microphone, and the information indicative of information provided to the processor by the input device is a digital audio recording.

In yet another embodiment again, the input device is a keypad, and the information indicative of information provided to the processor by the input device is text.

In a still further additional embodiment, the input device is a stylus, and the information indicative of information provided to the processor by the input device is text.

DETAILED DESCRIPTION OF THE INVENTION

Turning now to the figures, embodiments of dive computers in accordance with the present invention are shown that are configured to store information concerning dive sites. The stored information can provide divers with details concerning the geography of the dive site including information that alerts the diver to points of interest and/or potential hazards. In many embodiments, the information concerning the dive site is provided via a memory stick or is loaded onto the dive computer via a communication link with a personal computer.

Information concerning dive sites can be obtained from information systems in accordance with embodiments of the present invention. The information systems typically associate information with location and can include details of the geography such as the topology of the sea surface, information concerning ocean currents, information concerning species of marine life likely to be encountered in particular locations and/or at particular times, information concerning potential hazards and/or information concerning points of interest such as text, photographs, video sequences and/or audio commentaries. In many embodiments, the location associated with a piece of information is expressed using at least a depth coordinate and in many instances includes a latitude and a longitude coordinate. In other embodiments, other coordinate systems can be used. In a number of embodiments, information for a dive site is obtained from the information system and the information system can be updated with annotations made by a diver during a dive at the dive site.

Dive computers in accordance with embodiments of the invention can utilize information concerning a dive site to better locate the dive computer during a dive. In several embodiments, a dive log is generated using a combination of accurate location information (e.g. information obtained using Global Position System "GPS" signals) and estimates of location obtained by estimating the extent and direction of movement from an accurately located position. In a number of embodiments, the dive log can be supplemented with accurate location information obtained by locating a point of interest for which location information is stored in the dive computer. Knowing the location of the point of interested enables the dive computer to recalculate location estimates recorded in the dive log using any of a variety of location estimation algorithms.

Figure 1:
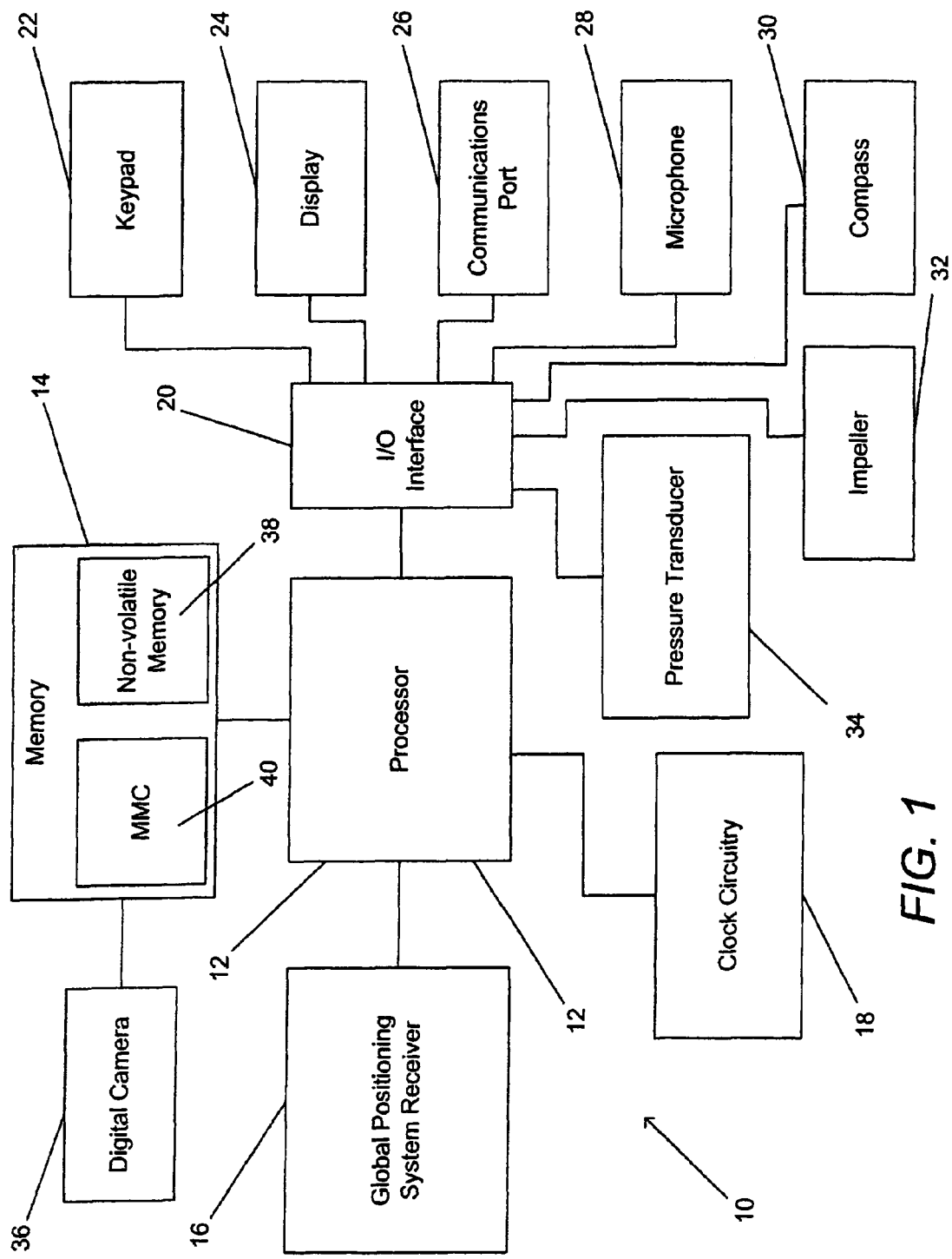
FIG. 1 is a schematic view of an embodiment of a dive computer in accordance with the present invention.

A dive computer 10 in accordance with an embodiment of the present invention is shown in FIG. 1. The core of the dive computer is a processing system 12. A memory system 14, GPS receiver 16, clock circuitry 18 and an input/output interface 20 are also connected to the processing system 12. The input-output interface enables the processing system to communicate with any number of devices. In one embodiment, the input/output interface is connected to a keypad 22, a display 24, a communications port 26, a microphone 28, a compass 30, an impeller 32 and a pressure transducer 34. In other embodiments, any number of devices can be connected to the input/output interface for communicating information to or from the processor. In addition to connecting devices through the input-output interface, devices with high data storage requirements may exchange information with the processor directly through the memory system. One such device is a digital camera 36 that can be interfaced with the processor directly through the memory system.

The processing system 12 can include one or more microprocessors and/or application specific integrated circuits capable of performing arithmetic calculations and data storage and retrieval functions.

The memory system 14 can be implemented using non-volatile memory or a combination of volatile and non-volatile memory. In the illustrated embodiment, the memory system is implemented using a combination of fixed volatile and non-volatile memory 38 and a removable non-volatile memory 40.

The GPS receiver is configured to receive signals from satellites that form part of the Global Positioning System and calculate the location of the dive computer. However, the GPS receiver can be implemented using any antenna and receiving electronics that can determine accurate estimates of location.

The input/output devices that can be used in a dive computer in accordance with an embodiment of the present invention include devices that can assist the dive computer in obtaining location estimates in the absence of a GPS signal. For example, a pressure sensor for determining depth below the surface of the water, a compass and/or an impeller can all be used to provide information concerning motion of the dive computer. Many embodiments include an inertial measurement unit (IMU). Information obtained from accelerometers and gyroscopes within the IMU can be used to obtain estimations of location with the aid of estimation techniques such as an Extended Kalman Filter (EKF). In other embodiments, any of a variety of input electronics in combination with any of a variety of algorithms can be used to determine estimates of location in the absence of GPS signals.

In addition to devices for estimating location, devices that can be used to provide information to a diver and/or record information can also be connected to the I/O interface. An output device that is connected to many embodiments of the present invention is a color display capable of displaying digital images stored within the dive computer. In a number of embodiments, the dive computer stores information concerning a dive site that includes images of marine life likely to be encountered at the dive site. The images can be displayed during a dive for the purpose of identifying marine life and recording the location of the marine life once identified.

As discussed above, dive computers in accordance with many embodiments of the present invention include the capability of storing information concerning one or more dive sites. The information can be accessed before, during and after a dive. In addition, the information can be modified by annotations or measurements made by the dive computer during the dive.

Figure 2:
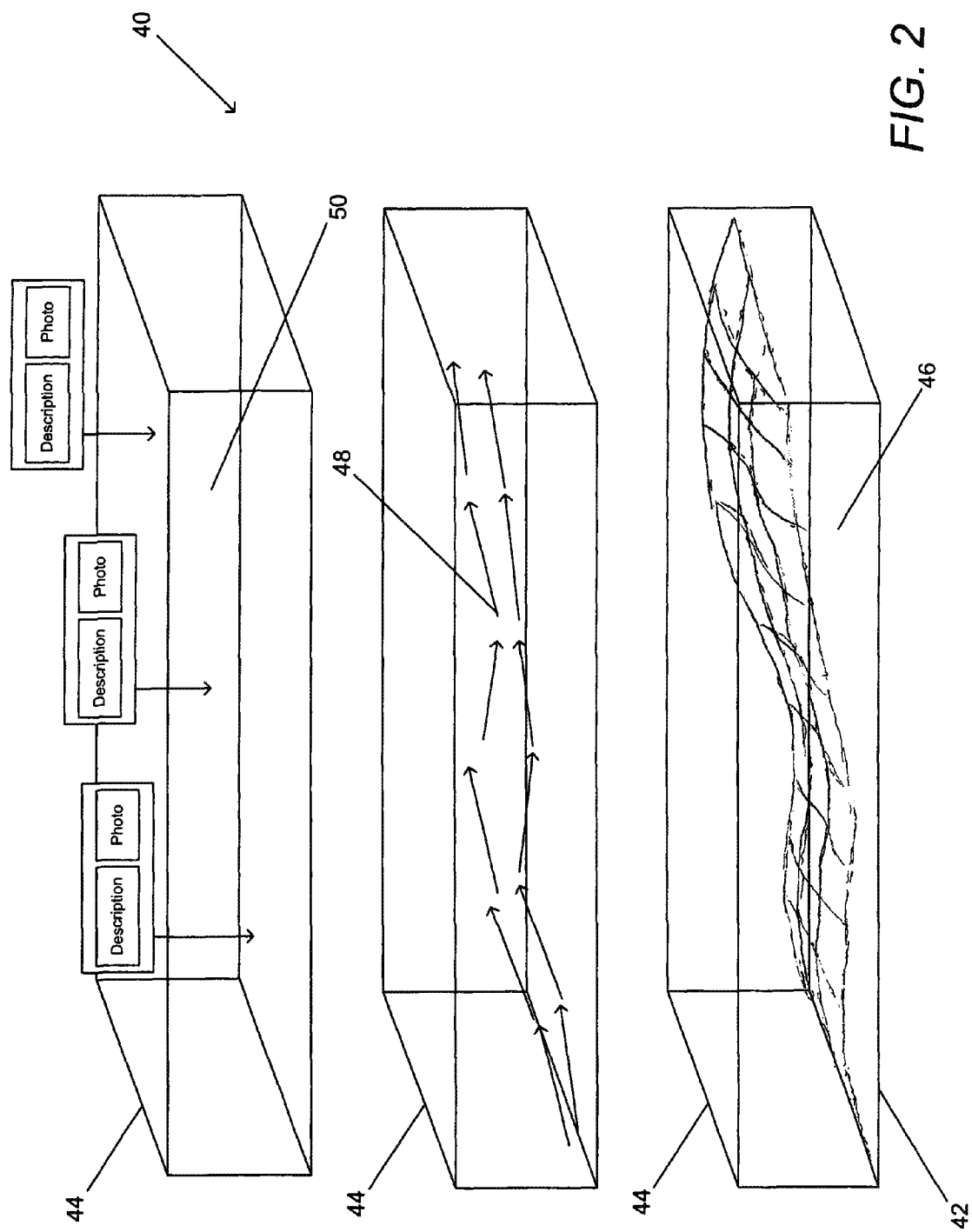
FIG. 2 is a schematic diagram that illustrates the concept of associating information with geographic locations.

In many embodiments, the information stored in the dive computer is stored in the form of a database where each piece of information is associated with a position or group of positions (e.g. a volume of space). A schematic diagram showing the manner in which information is overlaid in an information system in accordance with an embodiment of the invention is shown in FIG. 2. The information system 40 includes a space 42 defined by coordinates. Information concerning the geography of the space is stored in the information system and each piece of information has an associated coordinate location. Typically, the coordinates will include depth and latitude and longitude. Although in many embodiments, other coordinate systems can be used. In many embodiments, the information within the information system can be conceptualized as layers 44 and various layers can be combined to provide visual representations of the information. In one embodiment, a layer can be the topography of the space 46 and other layers can be overlaid to show information such as ocean currents 48 or points of interest 50. In many embodiments, other layers of information can be combined to provide visual representations of aspects of a dive site.

Although the above discussion describes the storage of information using specific coordinate locations, simple implementations of the system can organize information using a graphical user interface. Such an interface could show one or more graphical representations of a dive site and provide links to information relevant to locations indicated on the display. In several embodiments, the user is responsible for determining location and accessing information via the user interface that the user believes to be relevant to the user's location or something the user is observing (e.g. a list of marine life in the region). In a number of embodiments, the dive computer determines location and displays location. The user can use the displayed location information when determining information to access via the graphical user interface. When stored information includes associated location information, dive computers in accordance with embodiments of the present invention can automatically retrieve stored information associated with the location of the dive computer.

Figure 3:
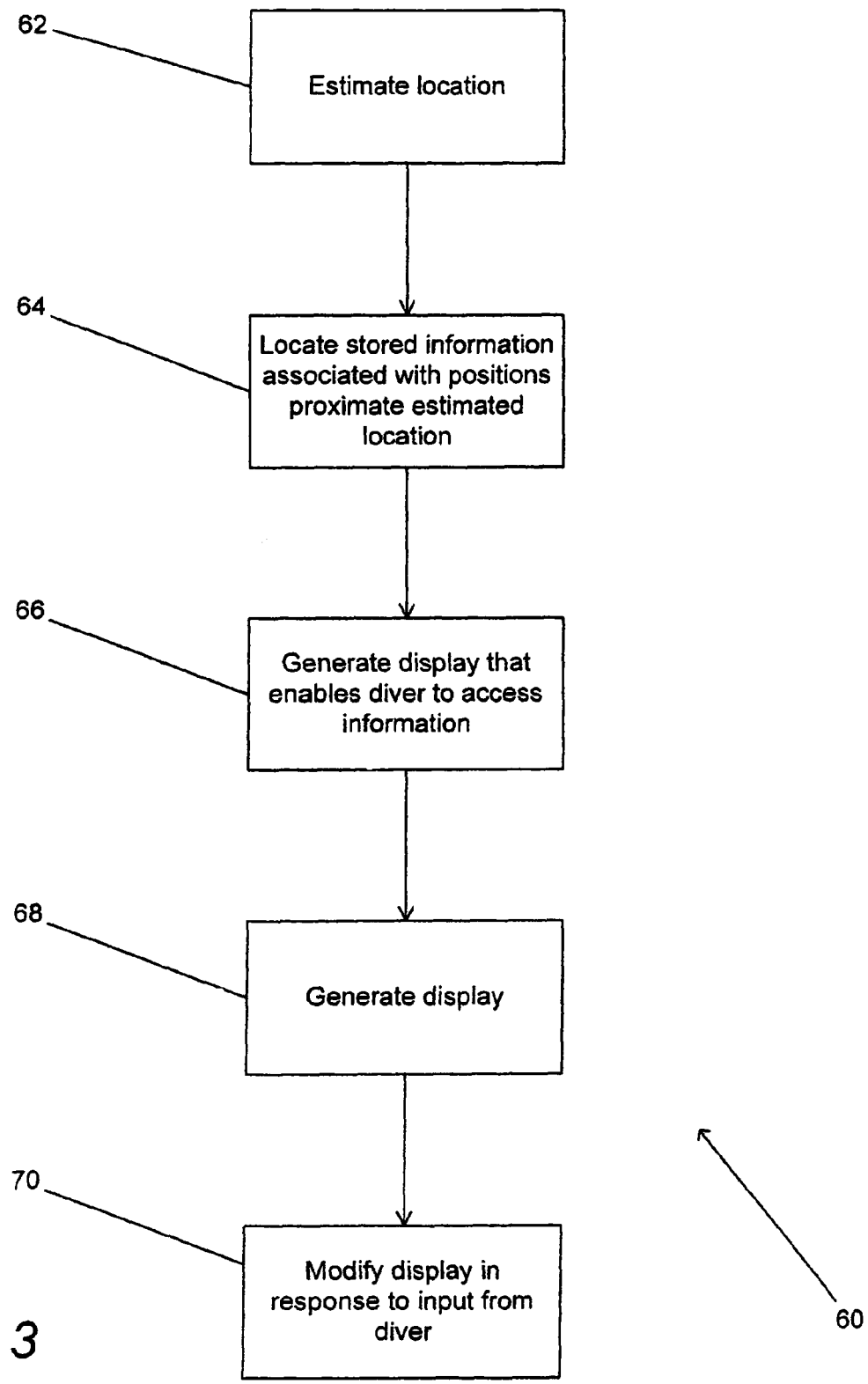
FIG. 3 is a flow chart that illustrates a process in accordance with an embodiment of the invention for retrieving information based on location.

A process in accordance with an embodiment of the invention for retrieving information associated with a location is shown in FIG. 3. The process 60 includes determining or estimating (62) present location. The present location can then be used to retrieve (64) information associated with the location or that is associated with locations within a predetermined distance of the location. The retrieved information can then be used to generate a display that either provides a visual representation of the retrieved information or provides a user of the dive computer with the ability to access (66) the information. When the information is accessed by a user, the information is displayed (68).

Various types of information that can be displayed are discussed above. A type of information that can be particularly useful is navigation information that provides direction to a predetermined way point. Dive computers in accordance with the present invention can provide visual displays such as arrows and directions to prompt a user to approach a predetermined location or follow a predetermined path. Dive computers in accordance with embodiments of the present invention can also store information concerning hazards that might be encountered at the dive site. For example, the hazard information can include information concerning areas where strong currents exist, areas prone to rock slides and/or areas known to be frequented by dangerous species of marine life. In many embodiments, a summary of hazards that can be encountered at the dive site as displayed at the point in time at which the user configures the dive computer to access information concerning the particular dive site. In addition, information concerning specific hazards can be displayed by the dive computer during the dive.

Figure 4:
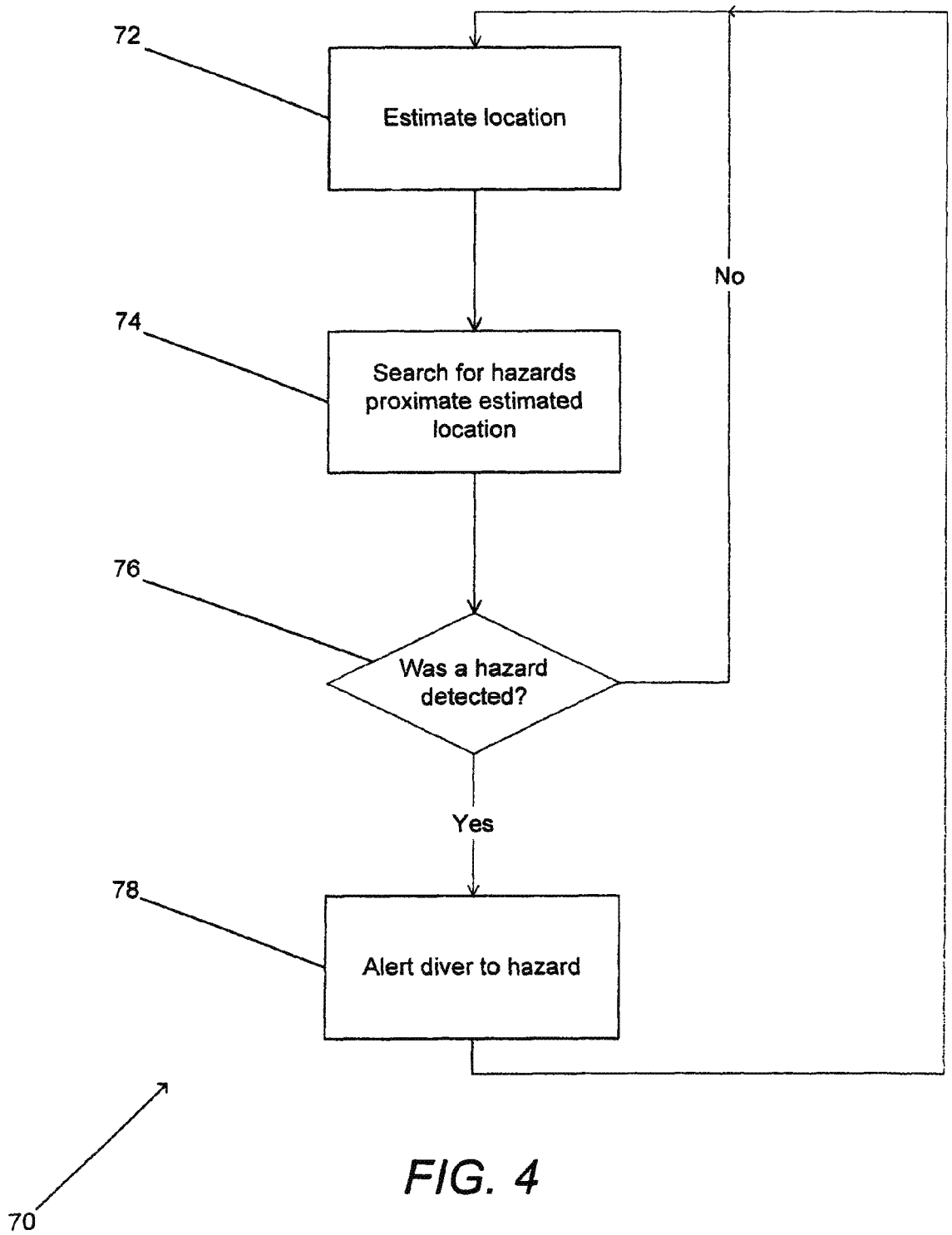
FIG. 4 is a flow chart that illustrates a process in accordance with an embodiment of the present invention for automatically providing warning information concerning potential hazards based on location.

A process in accordance with an embodiment of the present invention that can be used to alert a diver to a proximate hazard is shown in FIG. 4. The process 70 includes estimating (72) location and searching for hazards within a predetermined distance of (74) the estimated location. Alternatively, each entry relating to a hazard can have an associated predetermined safe distance and the process can determine whether the diver is maintaining a safe distance with respect to all known hazards. A decision (76) is made concerning whether a hazard is proximate the diver. If a hazard is proximate the diver, then the diver is alerted (78) to the hazard. The alert can be in the form of a warning shown on the display of a dive computer, a flashing warning light and/or an audible alarm.

Figure 5:
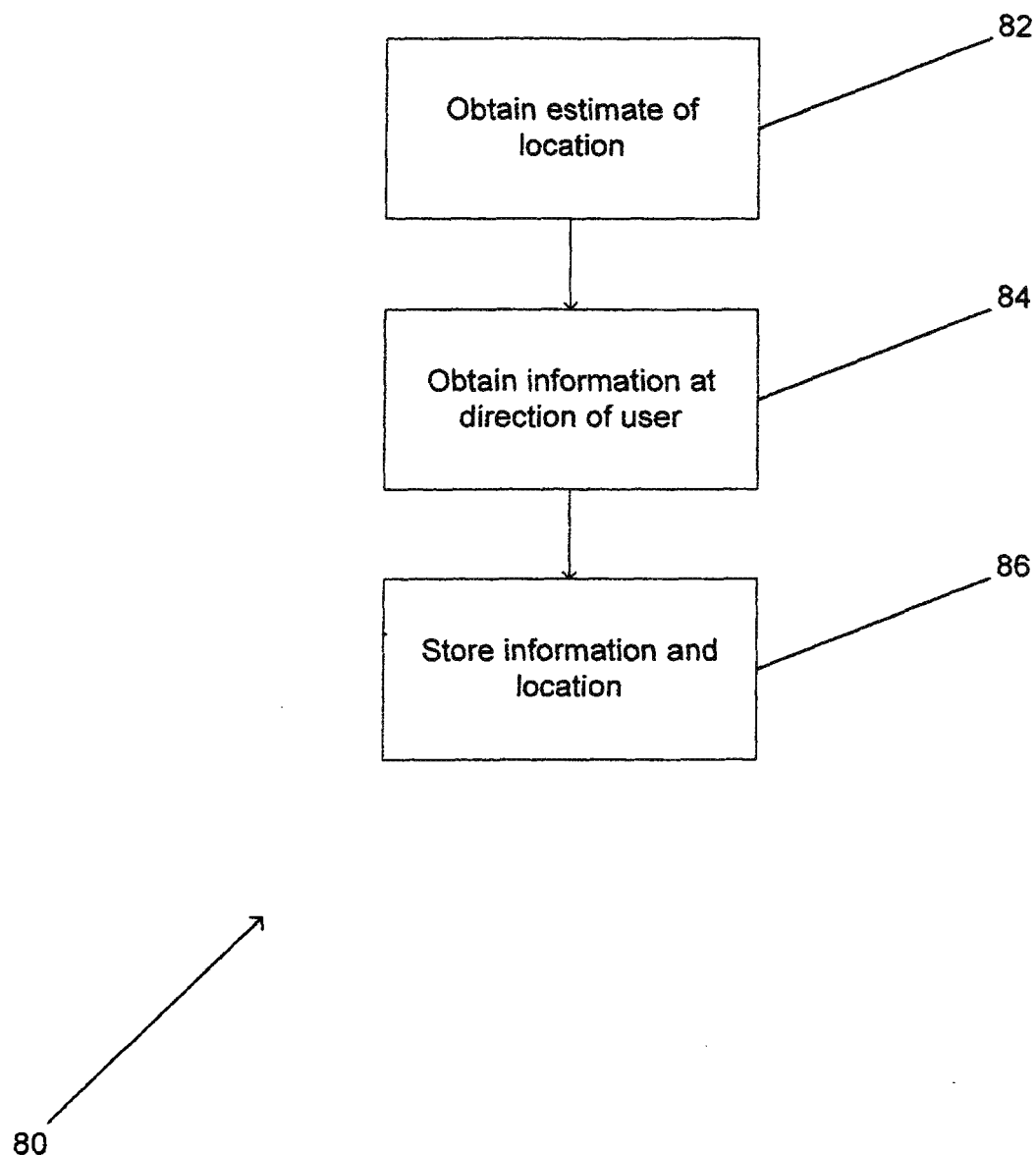
FIG. 5 is a flow chart that illustrates a process in accordance with an embodiment of the invention for storing information based on location.

In addition to informing the diver of information concerning the dive site, dive computers in accordance with embodiments of the present invention can record a variety of information concerning a dive state. A diver can for instance make a voice recording, enter text using a keypad or stylus and/or take a photograph. Any information entered by the diver (including the location estimate) can be associated with the location and/or information retrieved by the dive computer and stored as part of the dive site information. A process in accordance with an embodiment of the invention for storing information relating to a dive site is shown in FIG. 5. The process 80 includes estimating (82) location and receiving a user instruction to store information (84). The process then involves storing (86) the acquired information and the estimated location. In many embodiments, storing the acquired information includes storing the information and location as a supplement to the stored dive site information and storing the information and location as part of a dive log. In other embodiments, the information and location are stored as part of the information concerning the dive site and a link to the stored information is provided in the dive log. In several embodiments, the user is able to direct whether the information being stored is for inclusion in an information system and/or stored in a personal dive log.

As discussed above, information concerning a dive site can be used to obtain location information. During a dive, accurate information can often be obtained on the surface and estimates of location can be obtained during the dive using any of a variety of means. The accuracy of the estimates can vary and, as a general rule, the accuracy diminishes with increased time since the last accurate location measurement.

The accuracy of location estimates can be increased in accordance with many embodiments of the present invention by obtaining accurate location measurements while submerged. In several embodiments, accurate location measurements can be obtained while submerged through the use of information concerning the dive site. Known fixed points of interest can be used as reference points for obtaining accurate location information. A user of a dive computer in accordance with an embodiment of the invention can provide an input that indicates that the dive computer is proximate a known fixed point of interest and the dive computer can use the input to acquire the location of the dive computer from stored information concerning the point of interest. The location of the point of interest can then be used to modify previous location estimates and as the basis of future location estimates.

Figure 6:
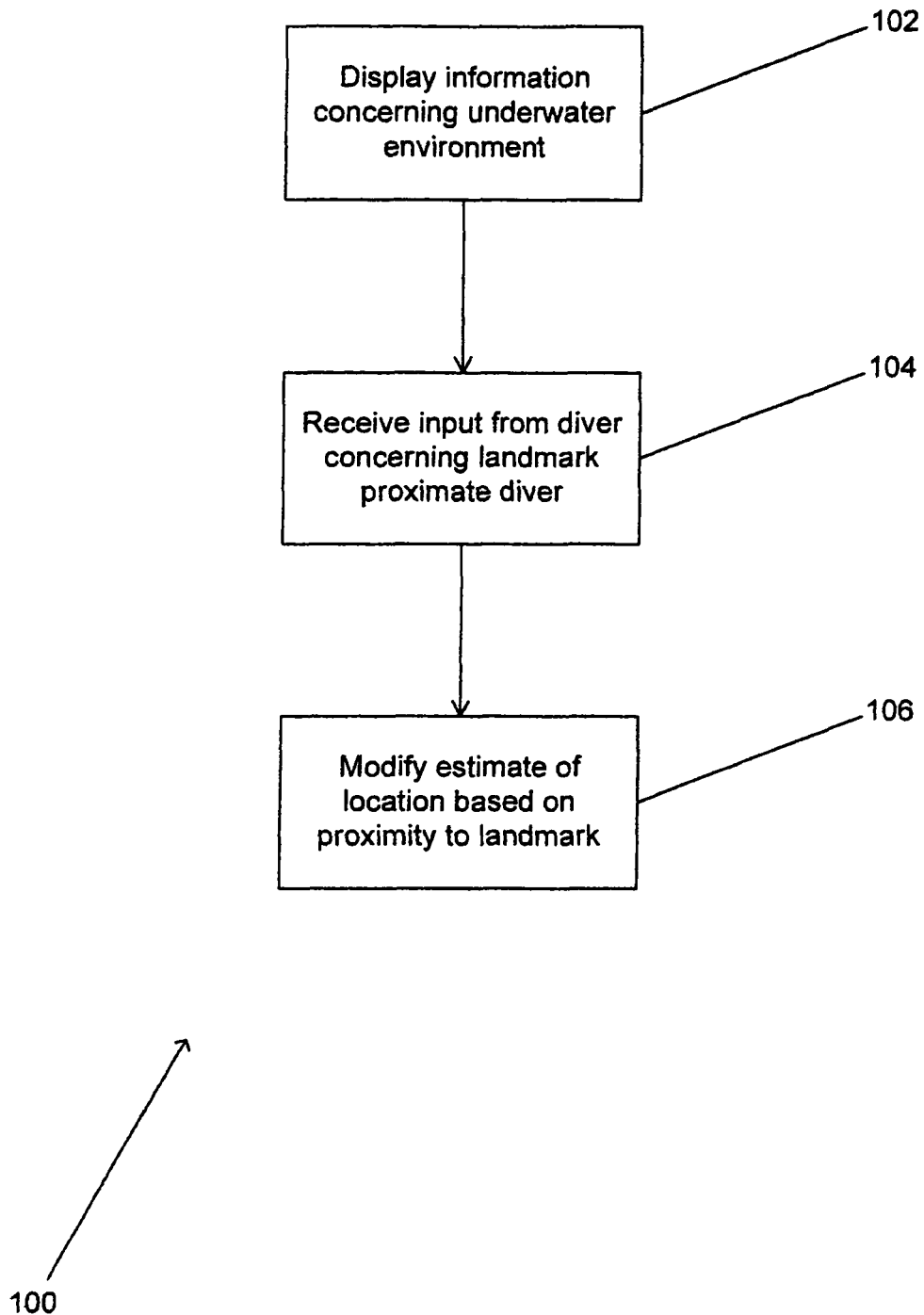
FIG. 6 is a flow chart that illustrates a process in accordance with an embodiment of the invention for updating information in a dive log based on information retrieved from an information system.

A process for modifying location estimates in response to arrival at a known point of interest in accordance with an embodiment of the invention is shown in FIG. 6. The process 100 includes displaying (102) information concerning the underwater environment and receiving (104) information from a diver concerning a landmark proximate the diver. In instances where the estimate of location places the diver proximate a point of interest, the displayed information could prompt the user to acknowledge whether the user is indeed adjacent the point of interest. In other embodiments, the user can preconfigure a list of points of interest and attempt to navigate toward one of the points of interest for location purposes. Even if the dive computer's estimation of location suggests the user is far from the point of interest, the user can retrieve the point of interest from the list or from memory and provide an input indicating that the point of interest has been located. Once input has been received from the diver concerning the point of interest, the location of the point of interest and the time can be included in the dive log. In many embodiments, previous location estimates can be modified in light of the new location information. In several embodiments, the estimates are modified (106) using an algorithm such as a line fitting algorithm that estimates location based upon two known points and the period of time taken to travel between the two points. In several embodiments, the location of a point of interest is used as the starting point for the generation of future location estimates.

Figure 7:
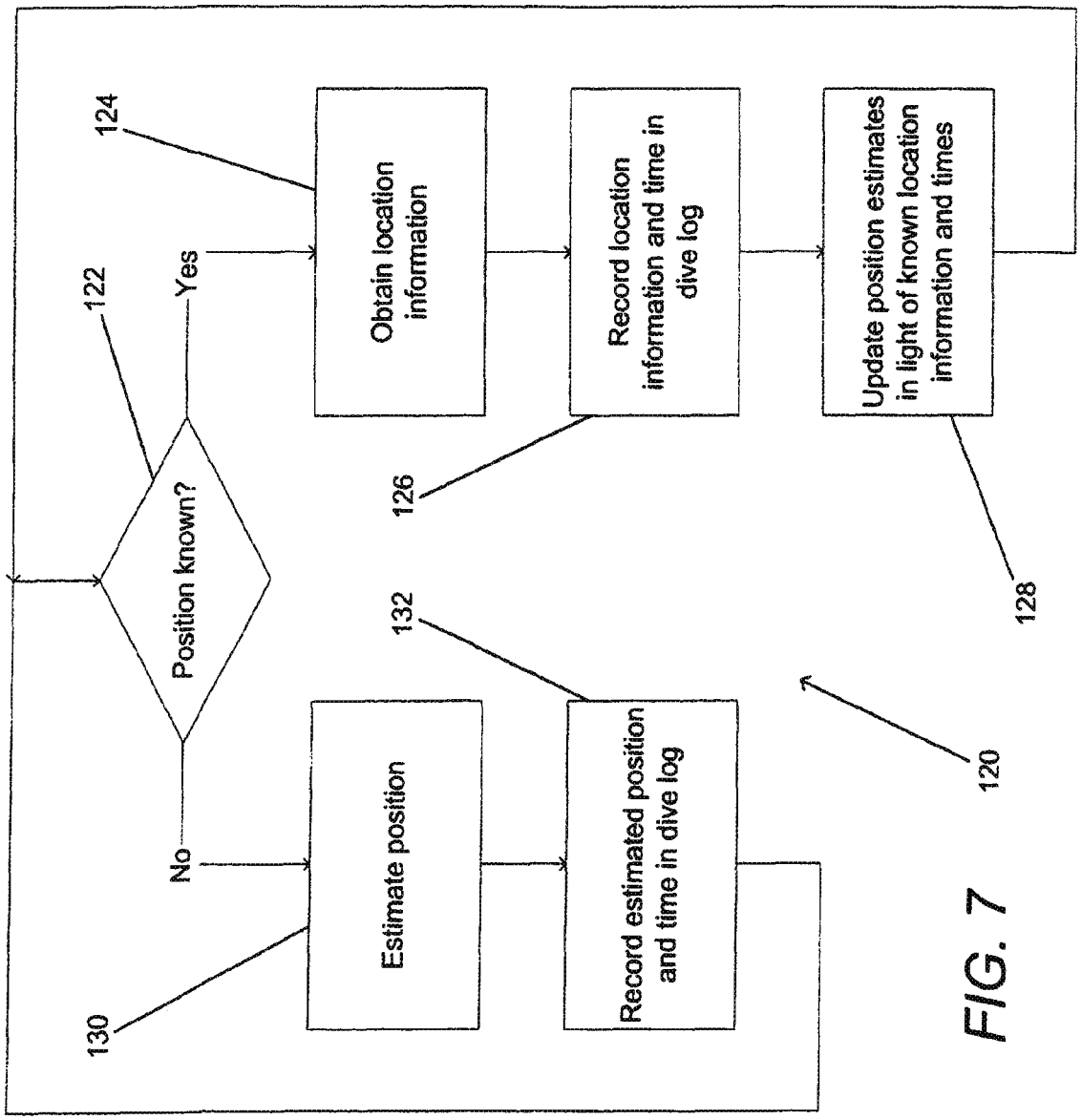
FIG. 7 is a flow chart that illustrates a process in accordance with an embodiment of the invention for revising previous estimates of location upon obtaining accurate location information.

A process for obtaining location measurements and estimating location between location measurements in accordance with an embodiment of the invention is shown in FIG. 7. The process 120 includes determining (122) whether position is known. Position is known when a measurement of location can be obtained with a high degree of accuracy using, for example, GPS signals and/or a known reference point. If position is known, then the location of the position is obtained (124) and logged (126) and previous estimates updated (128). The process of updating previous estimates will be discussed further below. When the position is not known, the location of the position is estimated (130). Location can be estimated using sensors that detect the direction and extent of motion. By tracking motion over time (often referred to as dead reckoning) an estimation of location relative to a previously known location can be obtained. The location estimate is then recorded (132) in the dive log.

As discussed above, estimates of location are typically recorded until a known position is reached. In many embodiments, the location of a known position can be used to improve previously recorded location estimates. In many embodiments, both the initial estimates and the improved estimates are recorded in the dive log. In several embodiments, the improved estimates replace the initial estimates in the dive log.

Figure 8:
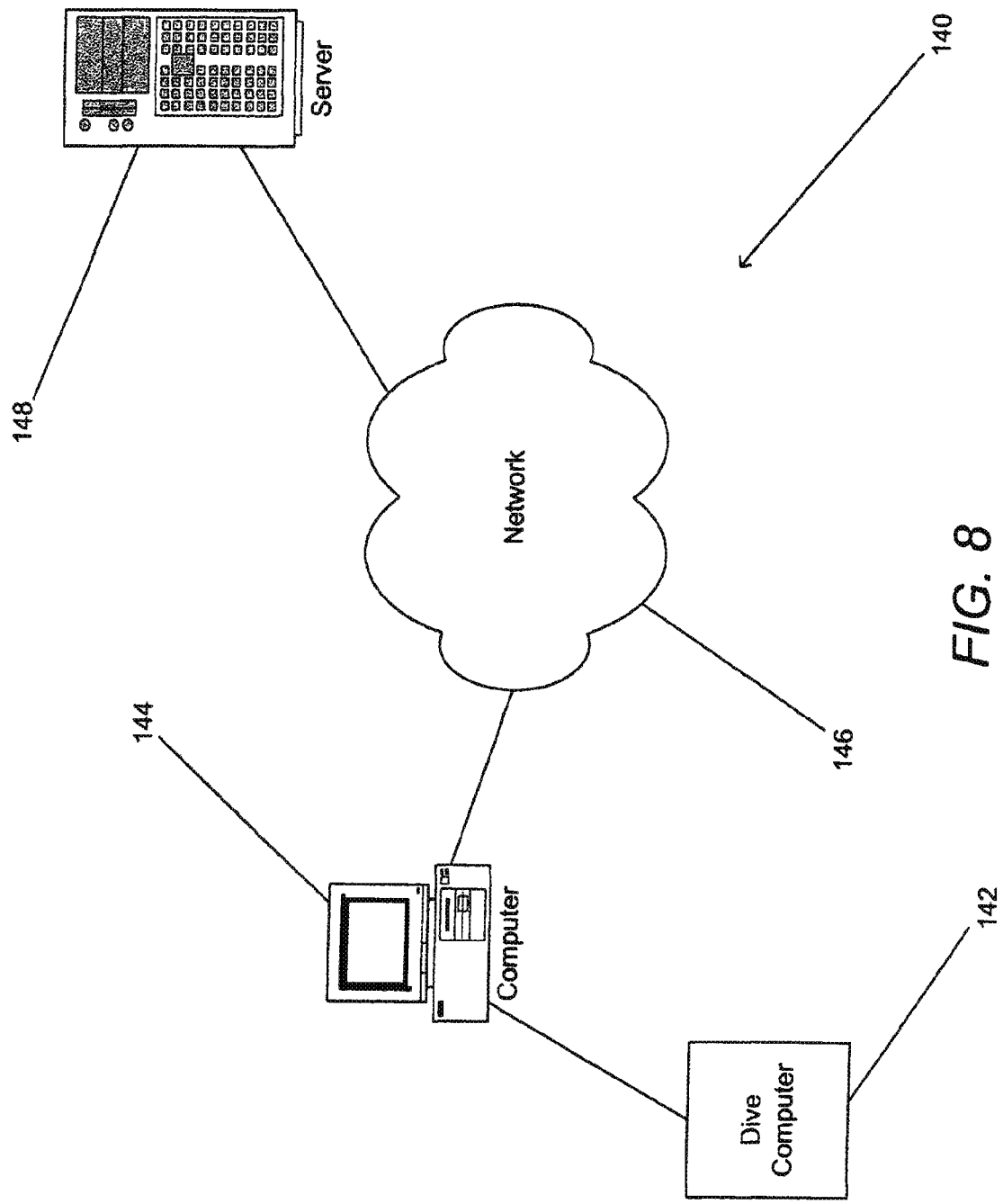
FIG. 8 is a schematic diagram that illustrates an embodiment of a dive computer in accordance with the present invention connected to another source of information via a communications link.

Information concerning a dive site can be downloaded from an information system to a dive computer in accordance with several embodiments of the invention. In addition, information recorded during a dive at a dive site can be uploaded to an information system. A schematic diagram of a dive computer connected to a personal computer for the purposes of uploading information to a remote information system is shown in FIG. 8. The system 140 includes a dive computer 142 connected to a personal computer 144. The dive computer can be physically connected to the personal computer via a wired connection or can exchange data via a wireless connection. In many embodiments, data is exchanged between the dive computer and the personal computer via a portable media such as a removable non-volatile memory. The personal computer 144 is connected to a network 146 and can communicate with a server 148 via the network. In many embodiments, the server hosts an information system. As discussed above, the information system can be used to provide information concerning a dive site. In addition, the information system can receive uploaded information recorded by the dive computer.

Figure 9:
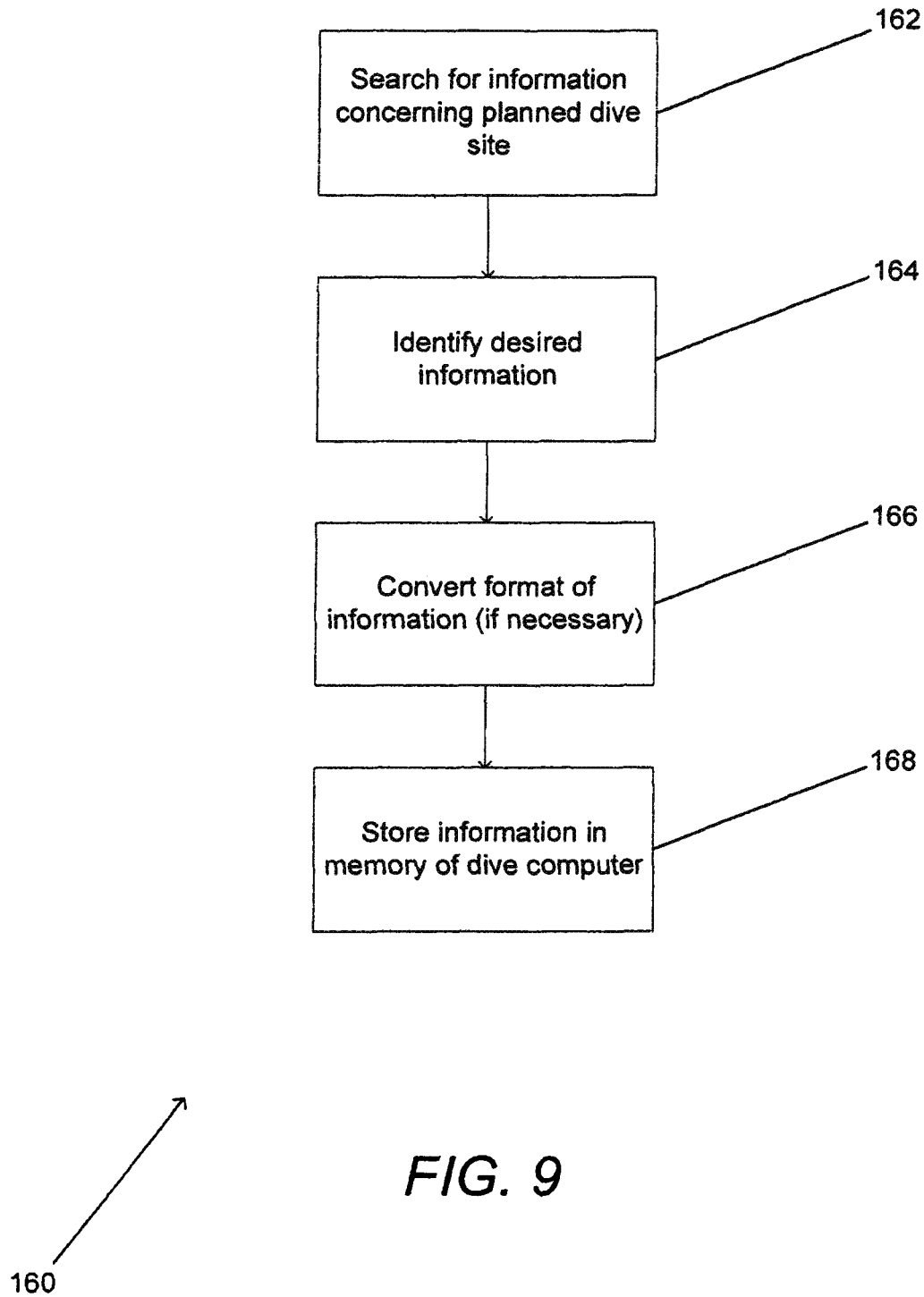
FIG. 9 is a flow chart that illustrates a process in accordance with an embodiment of the invention for downloading to a dive computer information relevant to a planned dive.

A process in accordance with an embodiment of the invention for obtaining information concerning a dive site from a remote information system is shown in FIG. 9. The process 160 involves initiating (162) a search of the information system for information relating to the dive site. The information system can return results for the search and the most relevant information for the dive site can be identified (164). The information within the information system may require conversion in order to be useful. Therefore, the information system or another device can convert (166) the information into a suitable format and the information can then be stored (168) in the memory of a dive computer in preparation for the commencement of a dive.

In addition to providing divers with information concerning a dive site, dive computers in accordance with embodiments of the present invention can record information concerning a dive site during a dive. In many embodiments, recorded information is stored in a dive log for the diver's personal use. The information can also be used to add points of interest to dive site information stored in an information system or to populate an information system with information concerning a new dive site. As one example, a previously unsighted species of marine life could be identified and added to the information system. In addition, additional points of interest and/or information enabling the refinement of location of previously identified points of interest could be added to the information system.

Figure 10:
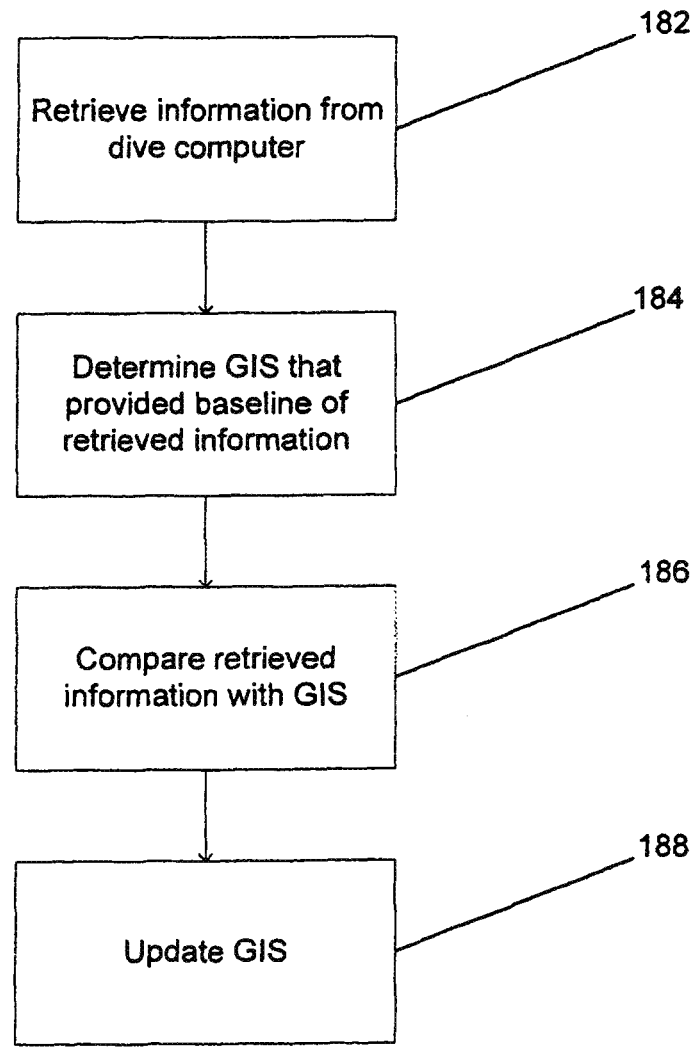
FIG. 10 is a flow chart that illustrates an embodiment of a process in accordance with the present invention for updating an information system with information collected using a dive computer.

A process for updating an information system using information recorded by a dive computer during a dive in accordance with an embodiment of the invention is shown in FIG. 10. The process 180 includes retrieving (182) information recorded during a dive and determining (184) an information system that includes information concerning the site of the dive. In many instances, the information system is the information system that provided information relating to the dive site in advance of the dive. The information recorded during the dive is then inspected for information that can be usefully added to the information system. In many embodiments, the recorded information is compared (186) to the information stored in the information system and recorded information that is not present in the information system is used to update (188) the information system. In many embodiments, the update can involve the exercise of discretion on the part of the information system and/or the dive computer.

Information systems in accordance with embodiments of the present invention can benefit from the addition of many different types of information recorded during dives. In a number of embodiments, recorded sightings of marine life and photographs of marine life can be uploaded. In other embodiments, commentary (recorded during the dive or recorded after a dive) concerning a point interest or hazard can be uploaded. In instances where the location of a point of interest is not known with a high degree of accuracy, an estimate of the location of the point of interest made during the dive can also be uploaded to the information system and used to refine the information system's estimate of the location of the point of interest.

Figure 11:
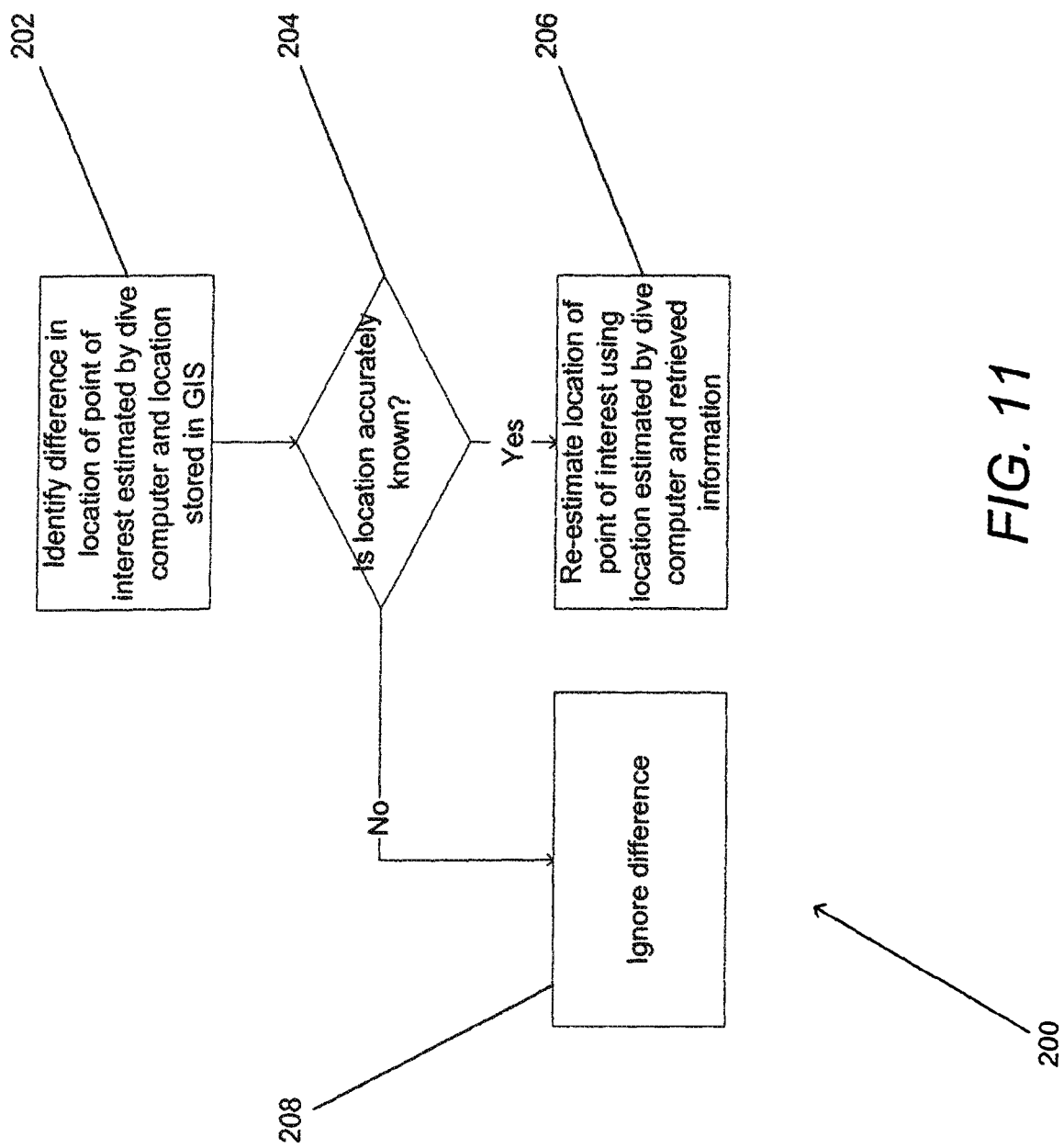
FIG. 11 is a flow chat illustrating a process in accordance with the present invention for re-estimating location information contained within an information system using measurements taken by a dive computer.

A process for uploading location estimates in accordance with an embodiment of the present invention is shown in FIG. 11. The process 200 includes identifying (202) differences in the stored location of a point of interest and an estimation of the location of the point of interest that was recorded during a dive. A decision (204) is then made concerning whether the location of the point of interest is known with a high degree of accuracy (e.g. the location was determined during an underwater survey). If the location of the point of interest is not known with a high degree of accuracy, then the estimate of location recorded during the dive can be added to other information collected by the information system concerning the point of interest and used to re-estimate the location of the point of interest. In many embodiments, the re-estimation can weight each of a number of estimates according to the accuracy of each measurement. In several embodiments, statistical techniques are used to create a new estimate of the location of the point of interest based on a number of recorded estimates and the error in the recorded estimates. By using multiple measurements, the error in the location estimate of a point of interest can be reduced over time. In many embodiments, the error can be reduced to a point where the location of the point of interest is considered known. The point of interest can then be used for obtaining location at the dive site.

Figure 12A:
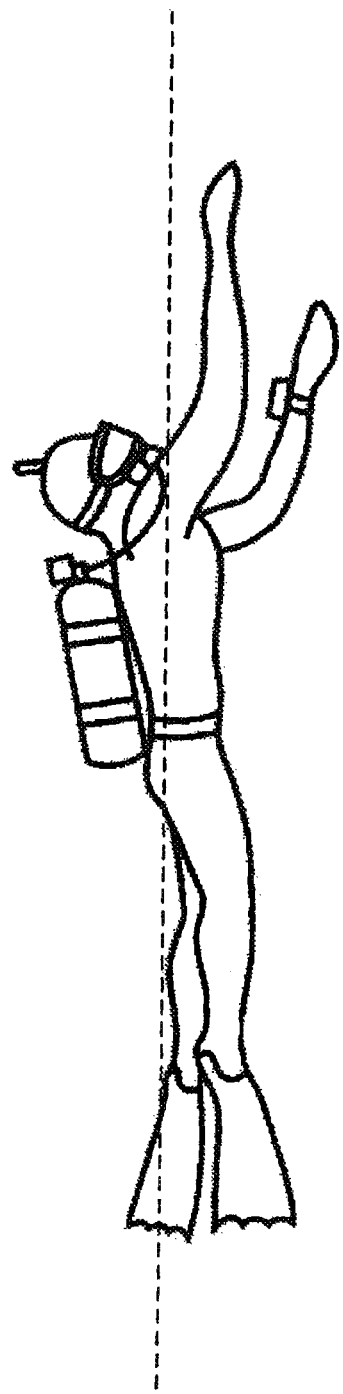
FIG. 12A is a schematic side view of a diver equipped with a dive computer in accordance with an embodiment of the present invention, where the dive computer is wrist mounted and receives information from a separate unit mounted to the diver's air supply.
Figure 12B:
FIG. 12B is a schematic side view of a diver equipped with a dive computer in accordance with another embodiment of the present invention, where the dive computer is connected to the diver's air supply via a hose.
Figure 12C:
FIG. 12C is a schematic side view of a dive computer in accordance with an embodiment of the present invention that is mounted to a diver's wrist.

Although the dive computer in FIG. 1 is shown as a single unit including components that are connected to each other, dive computers in accordance with embodiments of the present invention can be divided into multiple units that are separately housed. A dive computer in accordance with an embodiment of the present invention including a wrist mounted unit and a separate tank mounted unit that communicate wirelessly is shown in FIG. 12A. A dive computer in accordance with another embodiment of the invention that is a single hose mounted unit is shown in FIG. 12B and a dive computer in accordance with a further embodiment of the invention that takes the form of a wrist mounted unit is shown in FIG. 12C. In other embodiments, dive computers in accordance with the present invention can take on any variety of different forms utilizing one or more housings and possessing a variety of wired and/or wireless communications technologies.

While the above description contains many specific embodiments of the invention, these should not be construed as limitations on the scope of the invention, but rather as an example of one embodiment thereof. For example, although specific configurations of circuitry are discussed above, dive computers in accordance with the present invention can be constructed in any of a variety of configurations that are capable of performing basic dive computer functions such as measuring depth and calculating nitrogen loading and that are capable of retrieving stored information concerning a dive site. In many embodiments, the only source of location information is the diver. In such embodiments, the user of the dive computer can navigate through graphical prompts to obtain information about her/his present location. In several embodiments, relevant information is identified by displaying images of different points of interest. In many embodiments, location is irrelevant to the retrieved information. In a number of embodiments, the stored information is not linked to location. For example, the stored information might be a guide to marine life that includes photos, video sequences and audio related to marine life. Another example is a video sequence providing an overview of interesting features of the dive site. In other embodiments, the dive computer is capable of determining location and uses location information in the storage and retrieval of information concerning the dive site. Accordingly, the scope of the invention should be determined not by the embodiments illustrated, but by the appended claims and their equivalents.

What is claimed is:

1. A dive computer, comprising:
   a processor;
   memory connected to the processor and configured to store factual information concerning a dive site, where the factual information comprises at least one location and an additional piece of information describing the at least one location;
   a pressure transducer connected to the processor and configured to measure depth; and
   a display connected to the processor;
   wherein the processor is configured to:
      obtain location information, where the obtained location information is based on the location of the dive computer within the dive site;
      retrieve factual information from the memory based upon the obtained location information;
      generate a graphical user interface displaying at least a portion of the factual information concerning the dive site and provide links to additional data relevant to locations indicated via the display, where at least one link is a reference to information stored using the memory;
      display a prompt based on the at least one location and a portion of the factual information, where the prompt requests confirmation of the location of a portion of the factual information based on the at least one location and the obtained location information; and
      estimate the location of the dive computer in response to the confirmation of the location via the displayed prompt based on the obtained location information and the location of the confirmed portion of the factual information.

2. The dive computer of claim 1, wherein the memory is a removable non-volatile memory.

3. The dive computer of claim 1, wherein:
   the information concerning a dive site includes at least one way point;
   the retrieved factual information includes information concerning the location of the way point; and
   the displayed prompt includes directions from the obtained location to the way point.

4. The dive computer of claim 1, further comprising:
   an output device connected to the processor;
   wherein the information concerning a dive site includes information concerning potential hazards;
   wherein the processor is configured to search for hazards proximate the obtained location; and
   wherein the processor is configured to provide an alert using the output device in response to the detection of a hazard proximate the obtained location.

5. The dive computer of claim 4, wherein the hazards are selected from the group consisting of areas where strong currents exist, areas prone to rock slides, and areas known to be frequented by dangerous species of marine life.

6. The dive computer of claim 1, where the additional piece of information is selected from the group consisting of the topology of the sea surface, information concerning ocean currents, information concerning species of marine life likely to be encountered in particular locations, information concerning species of marine life likely to be encountered at particular times, information concerning potential hazards, information concerning points of interest, text, photographs, video sequences, and audio commentaries.

7. The dive computer of claim 1, wherein the portion of the factual information corresponds to an underwater landmark proximate to the location of the dive computer.

8. The dive computer of claim 7, wherein:
the estimate of the location of the dive computer is based on a time associated with the confirmation of the location of the underwater landmark; and
the time and the location of the underwater landmark are incorporated into a dive log.

9. The dive computer of claim 1, wherein:
the factual information further comprises topography information regarding the dive site; and
the processor is further configured to:
generate a first piece of visual layer data based on the topography information regarding the dive site;
the processor is configured to generate at least one piece of factual information visual layer data based on at least one piece of factual information; and
generate a visual representation of the dive site by combining the first piece of visual layer data with the at least one piece of factual information visual layer data based on the depth coordinate, latitude, and longitude of the pieces of factual information included in the at least one piece of factual information visual layer data.

10. A dive computer, comprising:
a processor;
memory connected to the processor and configured to store factual information concerning a dive site, where the factual information comprises at least one location and an additional piece of information describing the at least one location;
a pressure transducer connected to the processor and configured to measure depth; and
a display connected to the processor;
wherein the processor is configured to:
obtain location information, where the obtained location information is based on the location of the dive computer within the dive site;
retrieve factual information from the memory based upon the obtained location information;
generate a graphical user interface displaying at least a portion of the factual information concerning the dive site and provide links to additional data relevant to locations indicated via the display, where at least one link is a reference to information stored using the memory;
display a prompt based on the at least one location and a portion of the factual information, where the prompt requests confirmation of the location of a portion of the factual information based on the at least one location and the obtained location information; and
estimate the location of the dive computer in response to the confirmation of the location via the displayed prompt based on the obtained location information and the location of the confirmed portion of the factual information;
wherein the portion of the factual information corresponds to an underwater landmark proximate to the location of the dive computer;
wherein the estimate of the location of the dive computer is based on a time associated with the confirmation of the location of the underwater landmark; and
wherein the time and the location of the underwater landmark are incorporated into a dive log.

* * * * *